(12) United States Patent
Whitney

(10) Patent No.: US 8,289,639 B2
(45) Date of Patent: Oct. 16, 2012

(54) OPTICAL FILMS

(75) Inventor: Leland R. Whitney, St. Paul, MN (US)

(73) Assignee: 3M Innovation Properties Company, Saint Paul, MN (US)

( * ) Notice: Subject to any disclaimer, the term of this patent is extended or adjusted under 35 U.S.C. 154(b) by 231 days.

(21) Appl. No.: 12/743,890

(22) PCT Filed: Nov. 20, 2008

(86) PCT No.: PCT/US2008/084136
§ 371 (c)(1),
(2), (4) Date: Aug. 25, 2010

(87) PCT Pub. No.: WO2009/067576
PCT Pub. Date: May 28, 2009

(65) Prior Publication Data
US 2010/0309551 A1 Dec. 9, 2010

Related U.S. Application Data

(60) Provisional application No. 60/989,515, filed on Nov. 21, 2007.

(51) Int. Cl.
*G02B 5/04* (2006.01)
(52) U.S. Cl. ....................................... 359/833
(58) Field of Classification Search .......... 359/831–837; 362/620
See application file for complete search history.

(56) References Cited

U.S. PATENT DOCUMENTS

| | | | |
|---|---|---|---|
| 5,711,589 A | 1/1998 | Oe | |
| 5,771,328 A | 6/1998 | Wortman | |
| 5,882,779 A | 3/1999 | Lawandy | |
| 5,890,791 A * | 4/1999 | Saito | 362/620 |
| 5,940,149 A | 8/1999 | Vanderwerf | |
| 6,111,696 A | 8/2000 | Allen | |
| 6,354,709 B1 | 3/2002 | Campbell | |

FOREIGN PATENT DOCUMENTS

KR 10-2006-0011661 2/2006
KR 10-2007-0106397 11/2007

OTHER PUBLICATIONS

U.S. Appl. No. 60/936,845, entitled "Systems and Methods for Controlling Backlight Output Characteristics", filed Jun. 22, 2007.
International Search Report for PCT/US2008/084136, 3 pgs.
Written Opinion of the ISA for International Application No. PCT/US2008/084136, 3 pgs.

* cited by examiner

*Primary Examiner* — Euncha Cherry
(74) *Attorney, Agent, or Firm* — Robert S. Moshrefzadeh

(57) ABSTRACT

An optical film structure for backlit displays having two films, both in prisms up configuration. The first film, closer to the light guide, has an array of generally symmetric 90-degree prisms facing the viewer. The second film, farther from the light guide, has an array of generally asymmetric prisms facing the viewer, with one face of the prisms inclined at about 45 degrees and the other face generally perpendicular to the plane of the backlight. The prisms of the first and second films may have an azimuthal angle between them, and may have different pitches from each other. The film structure recycles a portion of the light from the light guide, thereby helping to increase uniformity over the area of the display. The film structure also compresses the light emerging from the light guide, thereby providing a more sharply peaked brightness distribution for the viewer.

24 Claims, 2 Drawing Sheets

OPTICAL FILMS

CROSS REFERENCE TO RELATED APPLICATIONS

This application is a national stage filing under 35 U.S.C. 371 of PCT/US2008/084136, filed on Nov 20, 2008, which claims priority to U.S. Provisional Application No. 60/989,515, filed on Nov. 21, 2007, the disclosure of which is incorporated by reference in its entirety herein.

FIELD OF THE INVENTION

The present invention is directed to optical films for displays.

BACKGROUND

Display screens are continually evolving to be brighter. Modern display screens use a backlight to provide roughly uniform illumination for the entire screen. There is generally a light-valve between the backlight and the viewer, which can attenuate the roughly uniform illumination on a pixel-by-pixel basis for each of three colors. These backlit screens have gained acceptance in the marketplace over a wide range of sizes, from small cellular telephone screens to large television displays.

Many of these backlit displays have one or more films that can tailor the perceived brightness as a function of viewing angle. Development of these films is ongoing, with a need for films that can enhance the perceived brightness of the backlight at viewing angles near normal incidence.

BRIEF SUMMARY

One embodiment is an optical film structure, comprising a first film comprising a first smooth side; and a first structured side opposite the first smooth side, the first structured side comprising a plurality of first linear prisms, each first linear prism formed by a first near surface and a first far surface, each first linear prism having a first peak at the intersection of the first near surface and the first far surface, the plurality of first peaks forming a first imaginary plane; wherein the first near surface forms an angle with the first imaginary plane between 35 and 55 degrees; and wherein the first far surface forms an angle with the first imaginary plane between 35 and 55 degrees; and a second film adjacent and parallel to the first film comprising a second smooth side facing the first structured side; and a second structured side opposite the second smooth side, the second structured side comprising a plurality of second linear prisms, each second linear prism formed by a second near surface and a second far surface, each second linear prism having a second peak at the intersection of the second near surface and the second far surface, the plurality of second peaks forming a second imaginary plane; wherein the second near surface forms an angle with the second imaginary plane between 70 and 110 degrees; and wherein the second far surface forms an angle with the second imaginary plane between 35 and 55 degrees.

A further embodiment is a film structure, comprising film means for providing a second beam having a second primary propagation angle between 45 and 65 degrees and a second beam width from a first beam having a first primary propagation angle between 5 and 25 degrees and a first beam width, the second beam width being less than the first beam width; and film means for providing a third beam having a third primary propagation angle between 80 and 100 degrees and a third beam width from the second beam, the third beam width being less than the first beam width, where the angles are from a plane parallel to the films.

A further embodiment is an optical film structure, comprising a first film comprising a first smooth side having a first surface normal; and a first structured side opposite the first smooth side, the first structured side comprising a plurality of first linear prisms, each first linear prism formed by a first face and a second face, the first and second faces each forming an angle with the first surface normal between 35 and 55 degrees; and a second film in proximity to the first film comprising a second smooth side opposed to the first structured side and having a second surface normal; and a second structured side opposite the second smooth side, the second structured side comprising a plurality of second linear prisms, each second linear prism formed by a third face and a fourth face, the third face forming an angle with the second surface normal between 0 degrees and 20 degrees, and the fourth face forming an angle with the second surface normal between 35 and 55 degrees.

DETAILED DESCRIPTION OF ILLUSTRATIVE EMBODIMENTS

Figure 1:
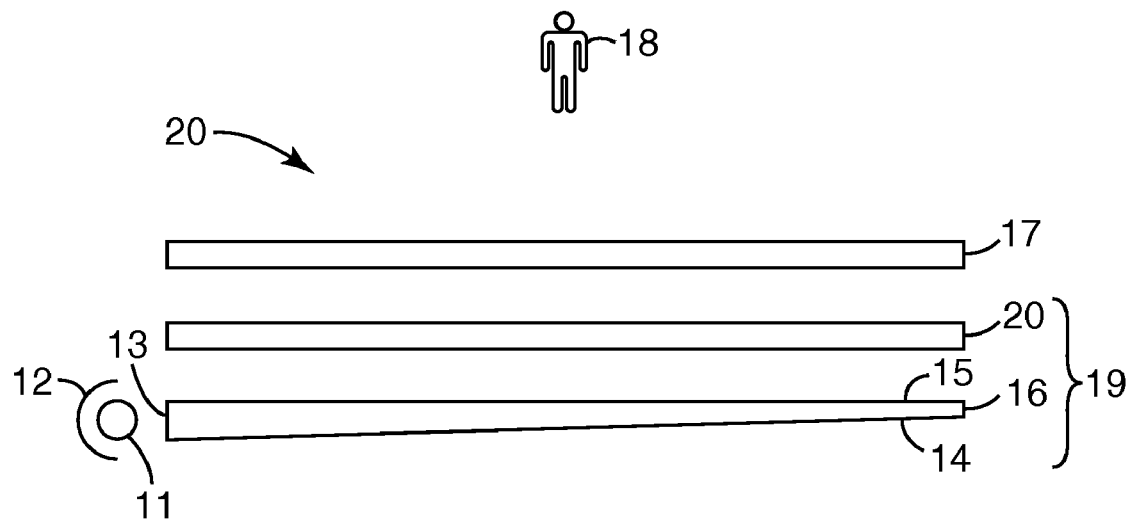
FIG. 1 is a plan drawing in cross-section of a backlit display.

FIG. 1 shows an exemplary backlit display 10. In this exemplary design, a pixel-by-pixel light-valve 17 is located between a viewer 18 and a backlight 19. The backlight 19 provides background light that is essentially uniform over the full extent of the display screen. The light-valve 17 operates on a pixel-by-pixel basis for each of three colors, and is controllable by suitable electronics to display a desired image. The light-valve 17 may be, for instance, a liquid crystal, located between two polarizers, or may be any other suitable optical light-valve.

The exemplary backlight 19 of FIG. 1 is shown in cross-section. Each component is described in further detail below, although it will be understood by one of ordinary skill in the art that other suitable backlight designs may be used.

The backlight 19 includes a lamp 11, typically a cylindrical fluorescent tube, although other lamps may be used, such as light emitting diodes. Although only one lamp 11 is shown, the backlight may include multiple lamps, each with a suitable location in the backlight. In the exemplary design of FIG. 1, the lamp 11 extends along one edge of the display.

Light from the lamp 11 may be reflected from an optional reflector 12, which is typically a curved or segmented reflecting surface. The reflector 12 directs light from the lamp 11 into a light guide 15.

The light guide 15 accepts light from the lamp 11, allows the light to propagate away from the lamp 11 through repeated total internal reflections, and allows a fraction of the light to escape the light guide per unit length away from the lamp 11. The exemplary waveguide 15 is nearly planar in shape, with a front surface and a back surface 14 that may have an optional wedge angle between them that causes the entrance surface 13 to be slightly thicker than the opposing surface 16. The wedge angle may be up to 1.0 degree, or may alternatively be zero. Either or both of the front and rear surfaces may be smooth or may be roughened, and either or both may have an optional grooved structure that helps direct light from the lamp 11 to the end opposite the lamp. The rear surface 14 may have an optional reflective coating. An optional reflective film may be located adjacent to the rear surface. Typically, the light guide 15 extends over the full area of the display 10.

The exemplary light guide 15 may use total internal reflection to help determine its emission characteristics. For instance, if light inside the light guide 15 strikes the exiting face at an angle of incidence greater than the critical angle, where the incidence angle of light is with respect to the surface normal, it is totally internally reflected. Alternatively, if light inside the guide strikes the exiting face at an angle of incidence less than the critical angle, a portion of it may be transmitted through the exiting face and may escape the light guide. If the light guide 15 contains a wedge between its front and back faces, then with each incidence on the front face, its incident angle is reduced by an amount proportional to the wedge, until after one or more reflections, light may finally strike the front face at less than the critical angle and may leave the light guide 15. In this manner, light may leave the light guide 15 over essentially the entire area of the light guide 15, not just immediately adjacent to the lamp 11.

The backlight 19 may have one or more films 20 that can redirect and/or redistribute light to improve the uniformity of the backlight and/or enhance the perceived brightness for a particular viewing angle or range of angles. Several films are discussed in detail below. Although the films 20 are shown in FIG. 1 to be part of the backlight 19, they may alternatively be separate from the backlight 19. Many of these films use total internal reflection to obtain their beneficial characteristics.

Between the backlight 19 and a viewer 18 is a light-valve 17, which can attenuate the light from the backlight 19 on a pixel-by-pixel basis. For instance, the light-valve may be an array of liquid crystals between two polarizers, which can attenuate the light in each pixel in response to suitable electronics. The attenuation is typically done for three colors, such as red, green and blue, so that color may be displayed.

The backlit display 10 of FIG. 1 is merely exemplary, and other suitable display designs having more, fewer, or different components may be used. In particular, the films 20 may be used for any suitable backlight and/or display, as will be understood by one of ordinary skill in the art. The films 20 are of particular interest, and will be described in more detail throughout the remainder of this document.

Figure 2:
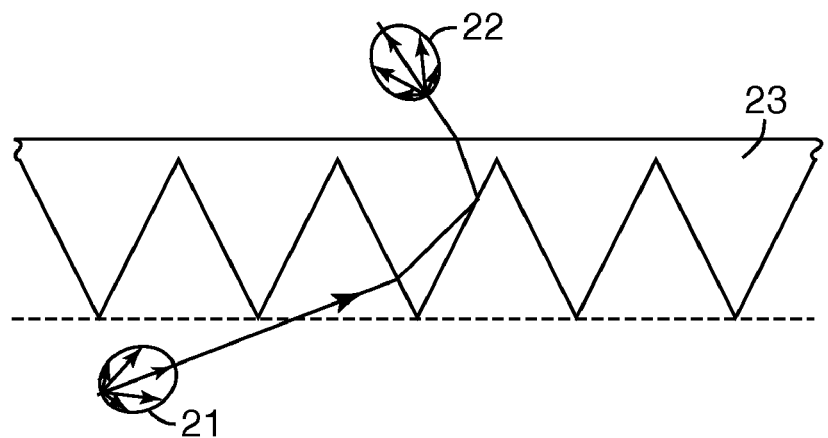
FIG. 2 is a plan drawing in cross-section of a known optical film.
Figure 3:
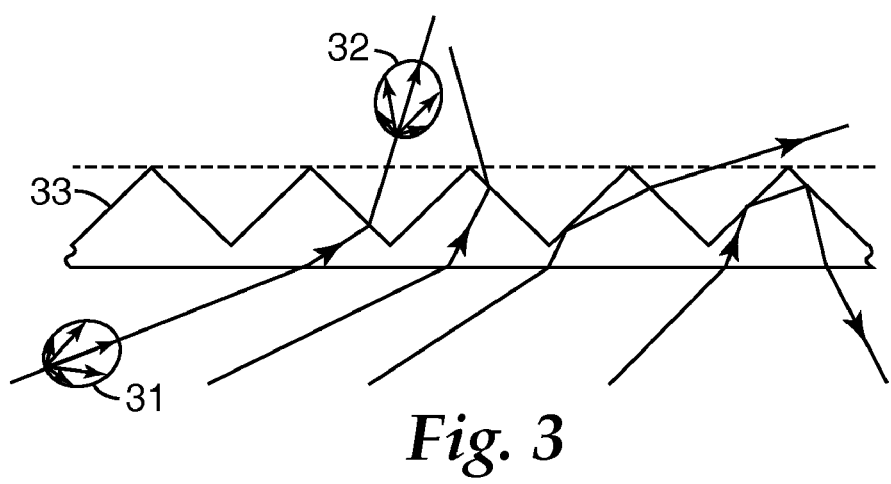
FIG. 3 is a plan drawing in cross-section of a known optical film.

FIGS. 2 and 3 show examples of known films, and their respective advantages and disadvantages are provided in the following paragraphs.

FIG. 2 shows an exemplary known film 23, as disclosed in U.S. Pat. No. 5,711,589, titled "Plane light source unit", issued on Jan. 27, 1998 to Oe et al. As drawn in FIG. 2, light enters the film 23 through its structured lower surface and exits through its smooth upper surface. A film in this orientation may be referred to as "prisms down". The light is redirected by a refraction at the structured lower surface, a total internal reflection inside the structured lower surface, and a refraction at the smooth upper surface.

The light incident on the film is not at just one incident angle, but is in a range of incident angles. There is a distribution of optical power (or, equivalently, power/angle or power/solid angle) having a maximum value at one particular incident angle, and having decreasing optical powers on either side of that particular angle. The angular range of incident power 21 may be denoted by any convenient metric, such as full-width-at-half-maximum (FWHM) or any other suitable metric. Similarly, there is a corresponding angular range of exiting power 22. For the geometry of the "prisms down" film of FIG. 2, the film turns the light without broadening the angular range, but does not significantly narrow the angular range.

Note that the entire range of incident angles follows essentially the same path through the film 23 of FIG. 2, with a refraction, then a total internal reflection, then another refraction. For the entire range of incident angles, the incident light passes upwards to the viewer; there are no paths that intentionally redirect light back downwards toward the light guide and/or the lamp. Accordingly, the film 23 of FIG. 2 may be referred to as "single pass", because each incident ray passes through the film only once from the light guide to the viewer. In some backlight films, it may be preferable to redirect a fraction of the incident light back toward the light guide so that spatial non-uniformities in the backlight may be masked; these films may be referred to as "multi-pass". Such "multi-pass" films may achieve improved uniformity across the area of the backlight. The "single pass" film of FIG. 2 lacks this advantage.

Note that in this context, a "smooth" surface may include a surface that is truly smooth to within typical manufacturing tolerances, or a surface that has a surface roughness, such as a diffuser. A diffuser on a "smooth" surface may optionally have asymmetric characteristics. A "smooth" surface may alternatively include moth eye structures. When used in this context, a "smooth" surface excludes any structure that has a particular orientation, such as grooves or channels where an individual element of the structure extends the length of the film. A "smooth" surface may also be flat on a micro-level, but curved on a macro-level, such as a flexible film that may be locally flat, but may attain a radius of curvature on the order of inches.

FIG. 3 shows another known film 33, as disclosed in U.S. Pat. No. 6,354,709, titled "Optical Film", issued on Mar. 12, 2002 to Campbell et al. As drawn in FIG. 3, light enters the film 33 through its smooth lower surface and exits through its structured upper surface or the lower surface. A film in this orientation may be referred to as "prisms up".

The path through the "prisms up" film of FIG. 3 depends on the incident angle. For some incident angles, the light may refract twice and exit toward the viewer. For less steep incident angles, the light may refract once, total internally reflect once, and refract a second time, exiting on the same side as the viewer. For even less steep incident angles, the light may refract once, total internally reflect twice, and refract a second time, exiting back toward the light guide. The light in these shallow incident angles returns to the back reflector, where it is reflected and redirected once again toward the "prisms up" film of FIG. 3. Because not all the light makes it through the film 33 of FIG. 3 in a single pass, the film 33 of FIG. 3 may be referred to as "multi-pass". Because the film 33 of FIG. 3 is "multi-pass", it advantageously "recycles" light, and may achieve improved uniformity across the area of the backlight.

Another way to "recycle" light is to use a reflective polarizer such as a wire-grid polarizer, a cholesteric liquid crystal polarizer or a multi-layer polymeric reflective polarizing film. Additional examples of nanoparticles and materials suitable for use in the pixels and films provided herein may be found, for example, in U.S. Pat. No. 5,882,779, titled "Semiconductor nanocrystal display materials and display apparatus employing same," issued to Lawandy. Furthermore, an exemplary polymeric film may be found in, for example, U.S. Pat. No. 6,111,696, titled "Brightness enhancement film," issued to Allen, et al.

In general, the optical films described herein may be made integral with a reflective polarizer, or may be made separately from and then later attached to a reflective polarizer. In either of these cases, the optical film is said to transmit one polarization state and reflect the perpendicular polarization state.

When used with a common light guide, rays typically are incident on the film 33 of FIG. 3 at an extremely high angle of incidence, typically 75 degrees or more. When this occurs, the exiting rays are centered about an angle that is significantly away from normal exitance. In other words, the majority of the exiting rays leave the film at non-normal incidence, so that a viewer in the typical viewing position does not receive optimal illumination. As a result, the film 33 lacks the advantage of a sharply peaked light distribution from the point of view of the viewer.

Accordingly, there exists a need for a film or a set of films that (1) may direct the light toward a viewer in the normal viewing position in a single pass, and (2) may have a smaller exiting angle range than incident angle range, which may provide a sharply peaked light distribution at normal exitance from the point of view of the viewer.

Figure 4:
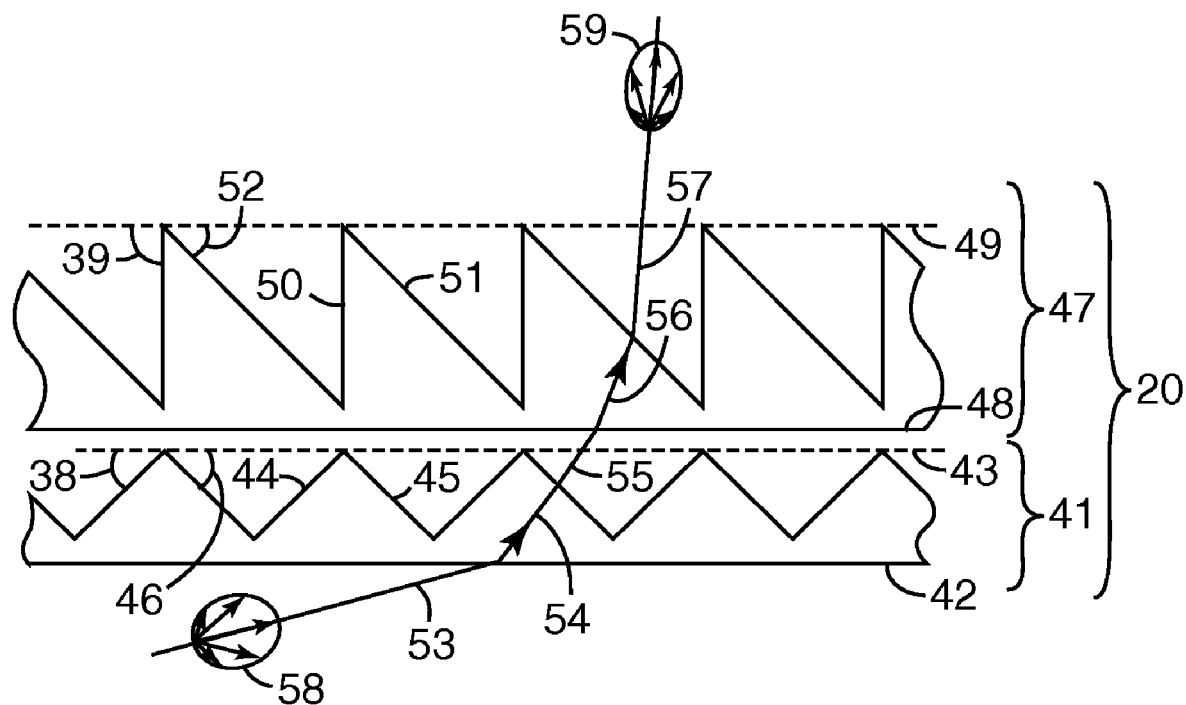
FIG. 4 is a plan drawing in cross-section of an optical film structure.

FIG. 4 shows an exemplary pair of films 20. The films 20 are shown in cross-section and extend into the plane of the page. Both films 20 may be considered part of the backlight 19, as in FIG. 1, or may alternatively be considered separate from the backlight.

A first film 41 may be adjacent to and optionally spaced apart from the light guide 15. The first film 41 has a smooth side 42 that faces the light guide 15, which may be considered locally flat to within typical manufacturing tolerances. The first film 41 has a structured side opposite the smooth side 42 that faces away from the light guide 15.

The structured side includes parallel, linear prisms, which may extend along all or a part of the display area. The prisms are formed at the intersection of near (or proximal) sides 44 with far (or distal) sides 45, where near and far are denoted with respect to the lamp (the leftmost edge of FIG. 4). The far sides 45 form an angle 46 with an imaginary plane 43 that connects the peaks of the prisms on the structured side of the first film 41. Similarly, the near sides form an angle 38 with the imaginary plane 43.

The second film 47 is analogous in construction to the first film 41, having a smooth side 48 that faces the first film 41, and a structured side opposite the smooth side 48. The structured side of the second film 47 also has parallel, linear prisms that may extend along all or a part of the display area, which are formed at the intersection of near sides 50 and far sides 51. The far sides 51 form an angle 52 with an imaginary plane 49 that connects the peaks of the prisms on the structured side of the second film 47. The near sides form an angle 39 with the imaginary plane 49.

The first and second films 41 and 47 may be spaced apart slightly in air, so that light does not couple from one film to the other without refracting. Alternatively, they may be in contact, with the imaginary plane 43 essentially in contact with all or a portion of the smooth side 48.

The prisms heights may be varied, as described in, for example, U.S. Pat. No. 5,771,328, titled "Light directing film having variable height structured surface and light directing article constructed therefrom," issued to Wortman, et al., and U.S. Pat. No. 6,354,709, titled "Optical film," issued to Campbell, et al. Such prism height variation may reduce the quantity of light coupled between films without refraction.

An exemplary light ray is traced through the first and second films, and is labeled in FIG. 4 as elements 53-57 in the regions between refractions. Each of these elements is referred to below as a "ray" for convenience, rather than a "ray portion". Ray 53 emerges from the light guide 15 and strikes the smooth side 42 of the first film 41 at a relatively high angle of incidence (with respect to a surface normal at the smooth side 42). The ray 53 is refracted at the smooth side 42 and is redirected along a direction that lies closer to the surface normal to form ray 54. Ray 54 propagates inside the first film 41 from the smooth surface 42 to the structured surface, and strikes the far side 45 at a relatively low angle of incidence. Ray 54 is then refracted at the interface of the far side 45, and exits the first film 41 as ray 55. Ray 55 propagates in air from the first film 41 to the second film 47, and strikes the smooth side 48 of the second film 47 at a smaller angle of incidence than that formed by ray 53 at smooth surface 42. Ray 55 refracts at the smooth surface 48 and propagates to the structured side of the second film 47 as ray 56. Ray 56 strikes the far side 51 of the second film 47, refracts, and exits the second film 47 as ray 57 directed toward the intended viewing position.

The refraction angles at each interface are governed by Snell's Law, which states that the product of the refractive index and the sine of the refraction angle (with respect to the surface normal) is constant, before and after refraction. Before refraction, the refraction angle may be referred to as the incident angle, and after refraction the refraction angle may be referred to as the exiting angle. Rays are traced by subsequent applications of Snell's Law at each interface through the films. The refractive index of air is essentially 1.0.

The refractive index of the films depends on the film materials and may have any suitable value, typically between about 1.4 and about 2.0. For a typical material such as polycarbonate, the refractive index may be between about 1.57 and about 1.62. Alternatively, the film may be made from two different materials, where the prisms are made from one material, and the base film is made from another material. For instance, the prisms may be made from a UV-cured acrylic with a refractive index of about 1.58, and the base film may be made from a polyester with a refractive index of about 1.66. Other suitable materials may be used as well. The first and second films may or may not be made from the same material.

The precise angles 46 and 52 of the far sides 45 and 51 are typically chosen based on the refractive indices of the materials used for the films 41 and 47, and based on the properties of the emission from the light guide 15. The following raytrace is a specific example, and other refractive indices and angles may be used as well. References are made to the element numbers of FIG. 4, although this is merely for clarity and should not be construed as limiting in any way. A ray 53 is assumed to exit the light guide 15 at a propagation angle (with respect to the plane of the light guide 15) of 15 degrees. The ray 53 strikes the smooth surface 42 of the film 41 at an incident angle of 75 degrees with respect to the surface normal. The refractive index of the film 41 is taken to be 1.58. Ray 53 refracts at the smooth surface and becomes ray 54, which forms an exiting angle with respect to the smooth surface normal of about 38 degrees. The propagation angle of ray 54 inside the film 41 (with respect to the plane of the light guide 15) is about 52 degrees. The angle 46 of the far side 45 is chosen to be 45 degrees. The angle of incidence of ray 54 with respect to the far surface 45 is about 7 degrees. Ray 54 refracts at the far surface 45 and becomes ray 55. Ray 55 exits the far surface 45 with an angle of exitance with respect to the far surface 45 of about 12 degrees. The propagation angle of ray 55 (with respect to the plane of the light guide 15) is about 57 degrees. Ray 55 strikes the smooth surface 48 of the film 47 with an incident angle of about 33 degrees with respect to the surface normal. The refractive index of the film 47 is taken to also be 1.58. Ray 55 refracts at the smooth surface 48 to form ray 56, which forms an exiting angle with respect to the smooth surface normal of about 20 degrees. The propagation angle of ray 56 inside the film 47 (with respect to the plane of the light guide 15) is about 70 degrees. The angle 52 of the far side 51 is chosen to also be 45 degrees. The angle of incidence of ray 56 with respect to the far surface 51 is about 25 degrees. Ray 56 refracts at the far surface and becomes ray 57. Ray 57 exits the far surface 51 with an angle of exitance with respect to the far surface 45 of about 41 degrees. The propagation angle of ray 57 (with respect to the plane of the light guide 15) is about 86 degrees; ray 57 is about 4 degrees from normal exitance from the films 20, and is directed toward the viewer. Note that tracing exemplary ray 53 through the films 20 involves little more than repeated applications of Snell's Law and attention to geometry. Other refractive indices and angles may be used as well.

The above methodology may be used to show that the range of angles becomes compressed as rays propagate through the films 41 and 47. Defining the propagation angle as with respect to the plane of the backlight (or, equivalently, the imaginary planes 43 and 49), we consider the propagation angles of rays at various locations throughout the films 20. We consider initially a propagation angle of ray 53, and define it to be 15 degrees+/−1.0 degrees, where the 1.0 degrees will give us an indication of the size of the angular range as the ray propagates. The value of 15 degrees may be considered a primary propagation angle, and the 1.0 degrees may be considered an angular beam width. Note that the actual illumination from the light guide 15 may contain significantly more angles than the 15 degrees+/−1.0 degrees considered here; in this example, we limit the width to +/−1.0 degrees for simplicity.

Tracing rays through the films, we find that ray 54 has a propagation angle of about 52 degrees+/−0.2 degrees. Ray 55 has a propagation angle of about 57 degrees+/−0.3 degrees. Ray 56 has a propagation angle of about 70 degrees+/−0.2 degrees. Ray 57 has a propagation angle of about 86 degrees+/−0.4 degrees. Compare the range of 1.0 degrees for the incident rays to 0.4 degrees for the exiting rays; a significant reduction is seen. In other words, the exiting angular range 59 is less than the incident angular range 58. This implies that more rays are directed toward near-normal exitance toward the viewer, resulting in a greater apparent brightness for near-normal viewing, and a desirably more sharply peaked brightness distribution from the point of view of the viewer.

Although the above example uses far surface angles 46 and 52 of 45 degrees, other values may be used, such as any value in the range of 40 to 50 degrees, the range of 35 to 55 degrees, or the range of 30 to 60 degrees. The far surface angles 46 and 52 may or may not be equal to each other.

Note that having different far surface angles implies that the propagation angles of the rays through the films may be different than the numerical values of the preceding example. In general, typical values of the propagation angles for ray 53 may be 5 degrees to 25 degrees, for ray 55 may be 45 to 65 degrees, and for ray 57 may be 80 to 100 degrees. These values are not to be considered limiting, and are merely exemplary.

The near surface angles 38 and 39 do not play a role in determining the exiting angles of rays 53-57 in FIG. 4, which refract at the air/film interfaces and are transmitted to the viewer without any reflections. However, the near surface angles 38 and 39 do affect the amount of light that is reflected by the films 41 and 47 and returned toward the light guide 15. Such returned light is "recycled", and is preferably re-reflected toward the films 20 until it is transmitted to the viewer 18. The angular criteria for the eventual transmission of such light is in part determined by the angles 38, 39, 46 and 52 of the prisms in the films 41 and 47. This "recycling" of light helps make the backlight output more uniform over its area, which is quite desirable. "Recycled" light can come from Fresnel reflections, scatter, or reflecting polarizers.

For instance, a fraction of the total energy in ray 53 will be reflected by surface 42 by Fresnel reflections. Eventually, the redirected rays are transmitted to the viewer, after one or more reflections and/or redirections from the various components in the backlight; this is the "recycling" of light mentioned above.

For the film 47, the near surface angle 39 may function less to redirect light and more to simply "stay out of the way" of transmitted ray 57. An exemplary near surface angle 39 may be 90 degrees, or may be in the ranges of 80-90 degrees, 70-90 degrees, 80-100 degrees, 70-110 degrees, or any suitable range. As a practical matter, it may be difficult to manufacture a film having a near surface angle of greater than 90 degrees.

Figure 5:
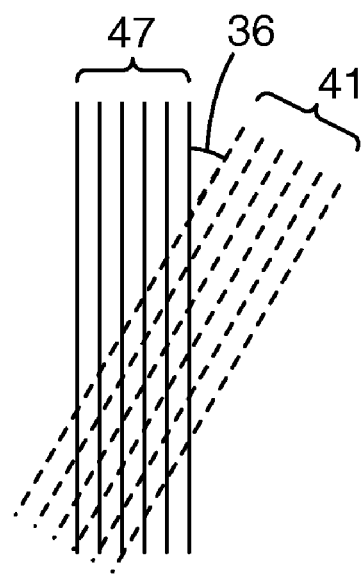
FIG. 5 is a plan drawing of the azimuthal angle between the optical films.

The films 41 and 47 are drawn in FIG. 4 as if the prisms in one film were parallel to the prisms in the other film. In practice, aligning the two films so that their prisms are truly parallel may lead to undesirable moiré effects. A way to avoid these moiré effects is to put a slight azimuthal angle 36 between the films, as shown in FIG. 5. An exemplary azimuthal angle may be 5 degrees in either direction (i.e., +5 degrees may reduce the moiré effects as much as a rotation of −5 degrees). Similarly, the azimuthal angle may be in the range of 2 to 10 degrees, in the range 0 to 20 degrees, or in any suitable range. To avoid moiré effects between the films and the light value pixels one film can be placed with a clockwise azimuthal angle with respect to the light value pixel axis and the other film placed with a counter-clockwise rotation of the same, or different amount as the first film. The slight azimuthal angle 36 may alter the final direction of the ray 57 which can be used to advantage to direct the light toward the viewer without changing the film construction, refractive index or prism angles.

For the films 41 and 47, there are various ranges for the pitches of the prisms, or, equivalently, the peak-to-peak spacing of the prism elements. The pitch may be smaller than about 50 or 60 microns, so that the individual prism elements are not visible to the viewer 18. The other end of the range of pitches may be determined by efficiency issues. During the manufacturing process, there may be rounding of the peaks of the prisms, with a radius on the order of 1 micron or more. This rounding is largely independent of the pitch. As the pitch is made smaller, the effects of the rounding become more prevalent, and show up as a loss in efficiency at very small pitches. As a result, the pitch may be made larger than about 5 microns to avoid losses in efficiency caused by the rounding. A useful range of pitches is about 5 microns to about 60 microns, although other ranges may be used. The pitches of the films 41 and 47 may be equal or may be unequal, although unequal pitches may further reduce undesirable moiré effects. In addition, the pitch of one film 41 or 47 may be unequal to an integral multiple of the pitch of other film, in order to further reduce undesirable moiré effects. Furthermore, the pitch of one film 41 or 47 may be unequal to a rational fraction of the pitch of other film (such as ⅖, or ¼), in order to further reduce undesirable moiré effects. For the purposes of this document, a rational fraction is said to have a numerator and a denominator that are both integers between 1 and 20.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The invention claimed is:

1. An optical film structure, comprising:
   a first film comprising
      a first smooth side; and
      a first structured side opposite the first smooth side, the first structured side comprising
         a plurality of first linear prisms, each first linear prism formed by a first near surface and a first far surface, each first linear prism having a first peak at the intersection of the first near surface and the first far surface, the plurality of first peaks forming a first imaginary plane;
         wherein the first near surface forms an angle with the first imaginary plane between 35 and 55 degrees; and
         wherein the first far surface forms an angle with the first imaginary plane between 35 and 55 degrees; and
   a second film adjacent and parallel to the first film comprising
      a second smooth side facing the first structured side; and
      a second structured side opposite the second smooth side, the second structured side comprising
         a plurality of second linear prisms, each second linear prism formed by a second near surface and a second far surface, each second linear prism having a second peak at the intersection of the second near surface and the second far surface, the plurality of second peaks forming a second imaginary plane;
         wherein the second near surface forms an angle with the second imaginary plane between 70 and 110 degrees; and
         wherein the second far surface forms an angle with the second imaginary plane between 35 and 55 degrees.

2. The optical film structure of claim 1,
   wherein the plurality of first near surfaces are all essentially parallel to each other;
   wherein the plurality of first far surfaces are all essentially parallel to each other;
   wherein the plurality of second near surfaces are all essentially parallel to each other; and
   wherein the plurality of second far surfaces are all essentially parallel to each other.

3. The optical film structure of claim 1, wherein the first peaks and the second peaks form an azimuthal angle between 0 degrees and 20 degrees.

4. The optical film structure of claim 1,
   wherein the first peaks form a first azimuthal angle with respect to a light-valve pixel axis, the first azimuthal angle having an absolute value between 0 and 20 degrees; and
   wherein the second peaks form a second azimuthal angle with respect to the light-valve pixel axis, the second azimuthal angle having an absolute value between 0 and 20 degrees and having the opposite sign of the first azimuthal angle.

5. The optical film structure of claim 1, wherein the first film and the second film are in contact.

6. The optical film structure of claim 1, wherein the first film and the second film are spaced apart.

7. The optical film structure of claim 1, wherein the first film and the second film have refractive indices between 1.4 and 2.0.

8. The optical film structure of claim 1, wherein at least one of the first film or the second film reflects light having a first polarization axis and transmits light having a second polarization axis perpendicular to the first polarization axis.

9. The optical film structure of claim 1,
   wherein the first peaks are spaced apart by a first pitch between 5 microns and 60 microns; and
   wherein the second peaks are spaced apart by a second pitch between 5 microns and 60 microns.

10. The optical film structure of claim 9, wherein the first pitch is different from the second pitch.

11. The optical film structure of claim 10, wherein the first pitch is different from a rational fraction of the second pitch.

12. The optical film structure of claim 11, wherein the first pitch and the second pitch are both different from a rational fraction of a light-valve pixel pitch.

13. The optical film structure of claim 1,
   wherein the first near surface forms an angle with the first imaginary plane between 40 and 50 degrees;
   wherein the first far surface forms an angle with the first imaginary plane between 40 and 50 degrees;
   wherein the second near surface forms an angle with the first imaginary plane between 80 and 90 degrees; and
   wherein the first far surface forms an angle with the first imaginary plane between 40 and 50 degrees.

14. A film structure, comprising:
   film means for providing a second beam having a second primary propagation angle between 45 and 65 degrees and a second beam width from a first beam having a first primary propagation angle between 5 and 25 degrees and a first beam width, the second beam width being less than the first beam width; and
   film means for providing a third beam having a third primary propagation angle between 80 and 100 degrees and a third beam width from the second beam, the third beam width being less than the first beam width.

15. The film structure of claim 14,
   wherein the first primary propagation angle is between 10 degrees and 20 degrees;
   wherein the second primary propagation angle is between 55 degrees and 59 degrees; and
   wherein the third primary propagation angle is between 84 degrees and 92 degrees.

16. The film structure of claim 15,
   wherein the first primary propagation angle is between 14 degrees and 16 degrees;
   wherein the second primary propagation angle is between 56.7 degrees and 57.3 degrees; and
   wherein the third primary propagation angle is between 85.6 degrees and 86.4 degrees.

17. An optical film structure, comprising:
   a first film comprising
      a first smooth side having a first surface normal; and
      a first structured side opposite the first smooth side, the first structured side comprising a plurality of first linear prisms, each first linear prism formed by a first face and a second face, the first and second faces each forming an angle with the first surface normal between 35 and 55 degrees; and a second film in proximity to the first film comprising
a second smooth side opposed to the first structured side and having a second surface normal; and
a second structured side opposite the second smooth side, the second structured side comprising a plurality of second linear prisms, each second linear prism formed by a third face and a fourth face, the third face forming an angle with the second surface normal between 0 degrees and 20 degrees, and the fourth face forming an angle with the second surface normal between 35 and 55 degrees.

18. The optical film structure of claim 17, wherein the first surface normal is parallel to the second surface normal.

19. The optical film structure of claim 17, wherein the first structured side is in contact with the second smooth side.

20. The optical film structure of claim 17, wherein the first structured side is spaced apart from the second smooth side.

21. The optical film structure of claim 17, wherein an azimuthal angle between the plurality of first linear prisms and the plurality of second linear prisms is between about 0 degrees and about 20 degrees.

22. The optical film structure of claim 17,
wherein the first linear prisms are disposed in a periodic pattern with a first periodicity between 20 microns and 60 microns; and
wherein the second linear prisms are disposed in a periodic pattern with a second periodicity between 20 microns and 60 microns.

23. The optical film structure of claim 22, wherein the first periodicity and the second periodicity are different.

24. The optical film structure of claim 17,
wherein the first faces form an angle with the first surface normal of about 45 degrees;
wherein the second faces form an angle with the first surface normal of about 45 degrees;
wherein the third faces are essentially parallel to the second surface normal;
wherein the fourth faces form an angle with the second surface normal of about 45 degrees; and
wherein the first linear prisms and the second linear prisms have a refractive between about 1.57 and about 1.62.

* * * * *

UNITED STATES PATENT AND TRADEMARK OFFICE
CERTIFICATE OF CORRECTION

| | | |
|---|---|---|
| PATENT NO. | : 8,289,639 B2 | Page 1 of 1 |
| APPLICATION NO. | : 12/743890 | |
| DATED | : October 16, 2012 | |
| INVENTOR(S) | : Leland R Whitney | |

It is certified that error appears in the above-identified patent and that said Letters Patent is hereby corrected as shown below:

Title Page, Item (73) (Assignee), Delete "3M Innovation" and insert -- 3M Innovative --, therefor.

Column 1, Line 7, Delete "Nov 20," and insert -- Nov. 20, --, therefor.

Signed and Sealed this
Twenty-sixth Day of February, 2013

Teresa Stanek Rea
*Acting Director of the United States Patent and Trademark Office*